United States Patent [19]

Arnold

[11] 4,233,508
[45] Nov. 11, 1980

[54] WATER INJECTION PROFILING

[75] Inventor: Dan M. Arnold, Houston, Tex.

[73] Assignee: Texaco Inc., White Plains, N.Y.

[21] Appl. No.: 970,708

[22] Filed: Dec. 18, 1978

[51] Int. Cl.$^2$ ............................................. G01V 5/00
[52] U.S. Cl. .................................. 250/259; 250/266; 250/270
[58] Field of Search ............... 250/259, 265, 266, 269, 250/270

[56] References Cited

U.S. PATENT DOCUMENTS

| Re. 27,272 | 1/1972 | Young | 250/260 |
|---|---|---|---|
| 2,617,941 | 11/1952 | Craggs | 250/260 |
| 4,032,781 | 6/1977 | Arnold | 250/266 |
| 4,035,640 | 7/1977 | Arnold et al. | 250/265 |
| 4,051,368 | 9/1977 | Arnold et al. | 250/270 |

Primary Examiner—Alfred E. Smith
Assistant Examiner—Janice A. Howell
Attorney, Agent, or Firm—Carl G. Ries; Robert A. Kulason; Jack H. Park

[57] ABSTRACT

Water injection profiling of a well by nuclear logging is disclosed. A dual detector sonde with a high energy neutron source and a spinner flowmeter is oriented and positioned above and below perforations in the casing of an injection well to monitor upward and downward flow, respectively, of injection water. The water is irradiated by the neutron source and resulting gamma ray production is sensed as the activated water flows by the spaced detectors. Count rate data is reduced and analyzed in terms of two energy windows to obtain linear flow velocities for water flow behind the casing. Fluid flow within the casing is measured by means of the spinner flowmeter. Volume flow rates are determined for upward and downward flow, and horizontal volume flow into the surrounding formations is calculated.

20 Claims, 5 Drawing Figures

WATER INJECTION PROFILING

BACKGROUND OF THE INVENTION

1. Field of the Invention

The present invention relates to systems and methods for logging wells to obtain information concerning the characteristics of underground structures. More particularly, the present invention pertains to logging techniques for determining the volume flow rates and flow directions of injected water moving behind the wellbore casing.

2. Description of Prior Art

In secondary and tertiary recovery of petroleum deposits, many of the recovery techniques employ the injection of water or chemical solutions into the earth formations comprising the reservoir from injection wells. Crucial information for proper planning of such a recovery operation includes the vertical confirmity of the producing formations as well as their horizontal permeability and uniformity. Such information may be obtained by an evaluation of the direction and speed of formation fluid flow by a borehole in the field. By obtaining such information at a sufficient number of boreholes throughout the field, a mapping of the total flow throughout a petroleum reservoir may be constructed to assist in the operational planning of injection of chemicals or water in the recovery process.

U.S. Pat. No. 4,051,368 discloses techniques for analyzing gamma ray count data obtained from activated formation fluid to reveal the horizontal flow speed of the fluid.

In such recovery operations, it is also critical to know the flow dynamics of the injected fluid through the injection well borehole and into the formations. Typically, an injection well is cased and the casing perforated at the levels of the formations into which fluid is to be injected. As fluid is pumped down the injection well, varying proportions of the fluid pass through the perforations into the different formations. The patterns of fluid flow into the various formations, including the proportion of fluid passing into each formation, are affected by the permeabilities of the formations themselves. However, the fluid flow pattern is also determined in part by the presence of vertical flow passages behind the injection well casing. Such vertical flow passages may be present in the underground structure itself. Further, channels, or voids, may occur in the cement anchoring the casing to the wall of the borehole. Injection fluid passing through the casing perforations and exposed to such vertical passageways is thus diverted upwardly and/or downwardly away from the formation intended to receive the fluid. Consequently, in order to plan for the injection of predetermined amounts of fluid within individual formations and to be able to monitor such fluid injection, a fluid injection profile of each injection well is necessary.

U.S. Pat. No. 4,032,781 discusses the occurrence of such vertical fluid communication in wells, particularly production wells. Such channels as well as naturally occurring passages may communicate fluid between a water sand structure, for example, and a producing formation, or even between two producing formations. Various methods of operation are described in the '781 patent for utilizing the technique of measuring vertical fluid flow by way of nuclear logging. Such methods of operation include not only the detection of fluid flow behind the wellbore casing but also include production profiling from spaced perforations within the casing. A logging sonde designed to measure vertical underground water flow behind casing lining a borehole is disclosed. A neutron accelerator is used to irradiate the flowing water with neutrons of sufficient energy to transform oxygen in the water into unstable nitrogen 16 particles. A pair of spaced gamma ray detectors monitors the radioactive decay of the $N^{16}$ particles flowing with the water current. Linear velocity as well as volume flow rate values for the water current may be obtained by appropriately combining the measured radiation detection data.

Copending United States patent application Ser. No. 920,504 filed June 29, 1978 and assigned to the Assignee of the present invention discloses techniques for monitoring the flow pattern of injected fluid behind the casing of injection wells. A dual detector nuclear logging sonde is used, and is operated to measure radioactive decay of $N^{16}$ particles in two gamms ray energy ranges, or windows. Values for volume flow rates of injected water flowing behind the casing are obtained for flow in the upward direction, the downward direction, and horizontally into the formations. However, the location of the center of the vertical flow behind the casing must be assumed to reduce the detector count rate data to obtain the volume flow rates.

SUMMARY OF THE INVENTION

During the injection of water in a cased well borehole, the injected water is irradiated with neutrons of 10 MEV energy or greater, and the subsequent gamma radiation from the exposed water is detected by a pair of detectors spaced along the borehole. Counting rates of the two detectors are analyzed in terms of two gamma ray energy windows. The linear flow velocity of fluid moving downwardly within the casing is measured by a mechanical flowmeter such as a spinner flowmeter. The geometry of the casing is used in conjunction with the count rate data to determine the volume flow rates of water moving upwardly behind the casing, downwardly behind the casing, along the inside of the casing below the perforation, and horizontally behind the casing into the formation.

Apparatus for practicing the invention includes a sonde equipped with a neutron source and dual radiation detectors for sensing the radiation resulting from the interaction of neutrons from the neutron source with target particles in the vicinity of the sonde. The neutron source may be a neutron generator, or accelerator, of the deuterium-tritium reaction type which produces neutrons of approximately 14 MEV energy. The radiation detection system may employ any pair of appropriate gamma sensors. The two sensors are deployed along the length of the sonde, with each sensor at a different measured distance from the neutron source. Appropriate shielding is interposed between the sensors and the neutron source to prevent direct bombardment of the sensors.

The sonde also includes a spinner flowmeter. A blade assembly is mounted on a shaft externally of the sonde housing, and is thus exposed to fluid flow along the interior of the well casing. Rotation of the blade assembly and shaft is proportional to the linear flow rate of fluid by the sonde. Sensor apparatus produces electronic pulse signals in response to the shaft rotation.

The sonde is suspended from the ground surface by an appropriate line or cable and connected to surface control, recording and data reduction equipment by appropriate electrical connectors, which may be included as part of the supporting cable.

The total volume flow rate of water injected into the well is obtained from a measurement of the linear flow rate using the spinner flowmeter with the sonde positioned between the highest perforation and the top of the well. This volume flow rate may also be determined by measuring the water injection rate at the surface, or by using known nuclear logging techniques for measuring flow within the casing as described in U.S. Pat. No. 4,032,781. The sonde is structured and oriented with the detectors below the level of the source, and is positioned just below a perforation in the casing at which the fluid flow is to be analyzed. The injected water is irradiated and gamma ray counts acquired by use of the detectors, and analyzed in terms of the two gamma ray energy windows. The linear velocity of the fluid flow downwardly within the casing just below the perforation in question is measured using the spinner flowmeter.

The radial distance of the center of the downward fluid flow behind the casing, just below the perforation, measured from the center of the casing, is calculated based on the count rate data and the measured linear downward flow within the casing below the perforation. The linear downward flow velocity of the water behind the casing is also determined based on the count rate data and the measured flow within the casing. Then, the volume flow rate of water downwardly just below the perforation and behind the casing is calculated based on count rate data, the value of the linear flow rate downwardly behind the casing, and the calculated radial position of the center of the flow downwardly behind the casing. The count rates acquired in monitoring downward fluid flow must be separated to distinquish radiation from fluid flowing within the casing from radiation from fluid flowing behind the casing.

The sonde is then reoriented and repositioned for upward flow measurement. Thus, the sonde is positioned just above the perforation in question and oriented with the two detectors above the neturon source. The flowing injected water is again irradiated and resulting gamma radiation detected and analyzed as a function of the two gamma ray energy windows. The upward volume flow rate for water moving behind the casing is then calculated according to the technique used for determining downward flow, utilizing the fact that there is no upward flow within the casing. By comparing the volume flow rates thus determined for water flowing into the well, upwardly behind the casing above a perforation, downwardly behind the casing below the perforation, and downwardly within the casing just below the perforation, the volume flow rate of injected water moving horizontally into the formation at the perforation can then be determined.

Where multiple perforations in a cased well are to be examined, the sonde may be positioned, say, below each perforation in turn with the sonde orientation selected to measure downward fluid flow velocity. Thus, all of the downward flow data may be acquired for all perforations in one trip of the sonde down the well. At each perforation, the total downward volume flow rate of fluid just above the perforation and within the casing is given by the downward volume flow rate within the casing as determined just below the perforation immediately above the perforation being examined. The sonde may be retrieved and oriented for upward flow measurement. Then, in a single trip down the well, the sonde may be positioned for measuring upward water flow just above each perforation in turn. In this way, complete data acquisition for water injection profiling of a multiple-perforation well may be accomplished in just two trips down the well.

According to the present invention, the linear downward flow rate of fluid within the casing may be measured by a spinner flowmeter. Thus, one additional measurement is provided, removing the necessity of relying on count rate data as a basis for calculating the volume flow rate within the casing. As a consequence, the location of the center of flow behind the casing may be calculated, rather than assumed, for both upward and downward fluid flow.

DESCRIPTION OF PREFERRED EMBODIMENTS

Figure 1:
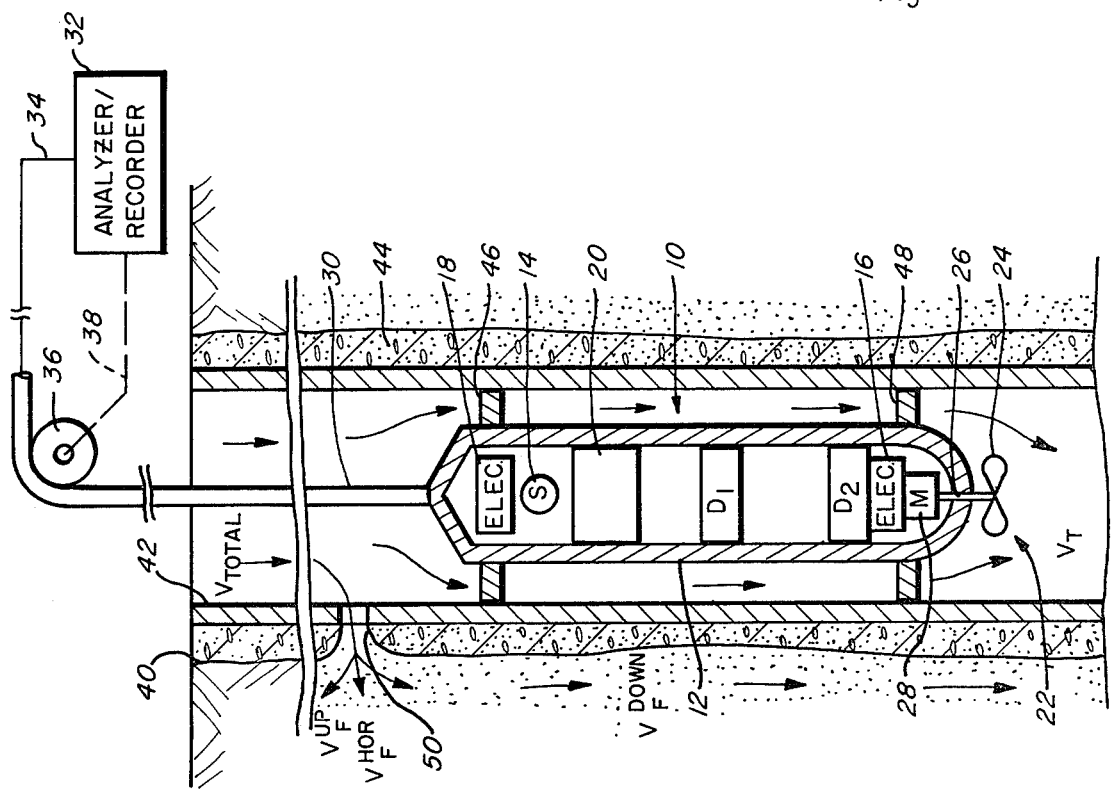
FIG. 1 is a schematic representation showing the essential features of a spinner sonde for practicing the present invention, suspended within a cased well borehole, and illustrating possible injected fluid flow.

A downhole spinner sonde for water injection profiling is shown schematically at 10 in FIG. 1. A fluid-tight housing 12 contains a neutron source 14 and a pair of gamma ray detectors D1 and D2 sequentially spaced from the neutron source 14 as shown. Necessary downhole electronic circuitry 16 is included to meet the power supply requirements of the detectors and to provide amplification of their output signals. The gamma ray detectors D1 and D2 may be of any appropriate type, such as scintillation counters well known in the art. It will be appreciated that the nature of the associated electronic circuitry 16 will be dictated in part by the choice of detectors D1 and D2.

The neutron source 14 is also provided with its own power supply and triggering circuitry 18. The neutron source 14 produces neutrons capable of reacting with the oxygen 16 particles in the injected water to produce the unstable isotope nitrogen 16, the reaction being $O^{16}(n,p)N^{16}$. The source 14 may be a neutron generator, or accelerator, of the deuterium-tritium reaction type which produces neutrons of approximately 14 MEV energy. Upon the capture of such a high energy neutron, an oxygen 16 nucleus is transmitted to radioactive nitrogen 16. The radioactive nitrogen 16 decays with a half life of about 7.1 seconds by the emission of a beta particle and high energy gamma rays having energies of approximately 6 MEV or more. A neutron generator is capable of providing the high energy neutrons in sufficiently high flux to produce enough radioactive nitrogen 16 particles in the injected water to allow the irradiated water flow to be detected by the spaced detectors D1 and D2.

Shielding 20 separates the neutron source 14 from the detectors D1 and D2 to prevent the detectors from being irradiated directly by the neutron source or radiation induced by neutron scatter in the immediate vicinity of the source.

A spinner flowmeter is shown generally at 22, and includes a spinner blade assembly 24 connected by a shaft 26 to a flowmeter sensor 28. The blade assembly 24 rotates freely as driven by the flow of fluid by the sonde housing. The shaft 26 is equipped with a magnet (not shown) so that, as the shaft is rotated by the spinning blade assembly 24, an induction coil (not shown) within the flowmeter sensor 28 detects the rotation of the shaft and blade assembly. Electronic pulses are thus produced in number proportional to the speed of rotation of the blade assembly 24 and, therefore, proportional to the linear flow velocity of fluid by the sonde. A spinner flowmeter of the type described is used in the Schlumberger Production Combination Tool, described in the publication "Schlumberger Engineered Production Services" published by Schlumberger Well Services of Houston, Tex., although the construction and method of operation of the spinner flowmeter used in the present invention may be varied.

The sonde 10 is suspended by an armoured cable 30 which leads to the well surface. The cable 30 not only supports the sonde 10, but also encompasses a protective shield for electrical conductors leading from appropriate instrumentation at the surface to the various components within the sonde. Such surface instrumentation is represented schematically in FIG. 1 by an analyzer/recorder 32 shown connected to the cable 30 by a conductor 34, it being understood that additional, known surface equipment is involved. Further, the supporting cable 30 is illustrated as passing over a sheave 36 schematically joined to the analyzer/recorder 32 by a connector 38. Thus, the location of the sonde in the well may be monitored by use of the sheave 36. The data signals from the two detectors D1 and D2 may then be analyzed and related to the well level at which the count data was acquired, and the results recorded. Similarly, the cable 30 carries the spinner flowmeter pulses, amplified if necessary, to appropriate surface recording equipment (not shown) whereby linear fluid flow rates within the casing may also be analyzed and related to the level at which the measurements were made.

Additional details of a dual detector neutron source sonde and related surface electronics for data analysis are disclosed in the aforementioned U.S. Pat. No. 4,032,781. Further, the advantages of operating the neutron source and detectors in a pulsed mode rather than a continuous mode are described in the '781 patent. Except as required for clarity, such details of apparatus and data processing techniques, being known in the art, will not be described in further detail herein.

The sonde 10 is shown in FIG. 1 suspended by the cable 30 within a well 40 lined with casing 42 anchored in place by cement 44. Centralizers 46 and 48 are fixed to the sonde housing 12 to maintain the sonde centered within the casing 42.

Figure 2:
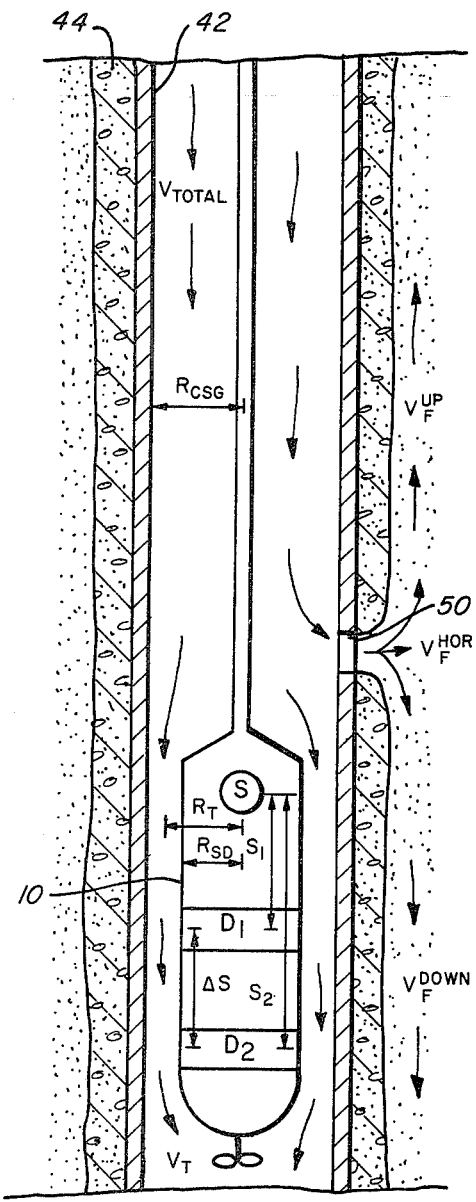
FIG. 2 further details the positioning of the sonde for obtaining downward flow data.
Figure 3:
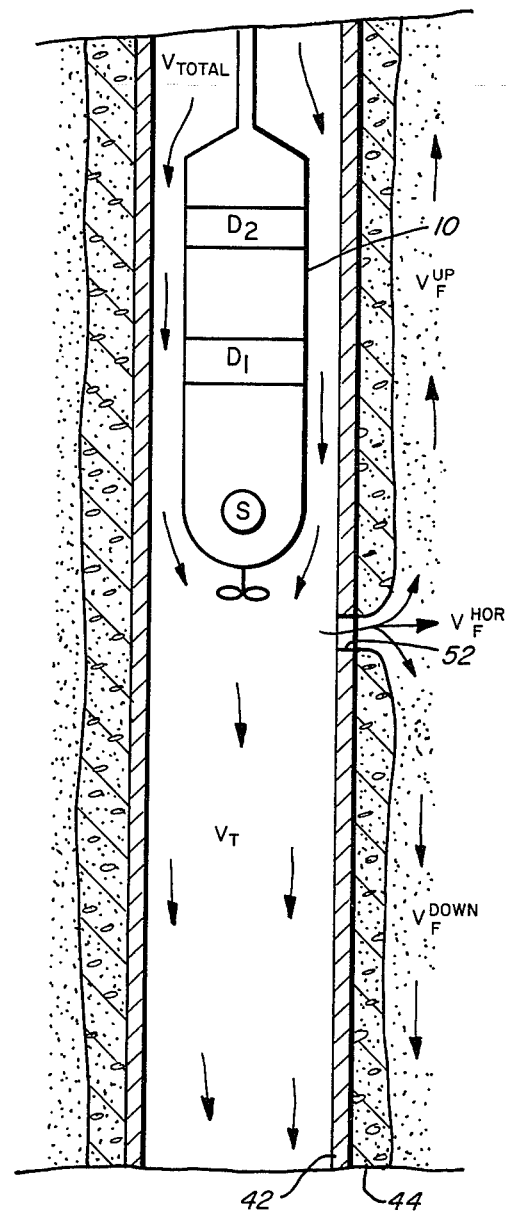
FIG. 3 illustrates the positioning and orientation of the sonde for upward flow measurements.

A portion of the injected water may be diverted at each casing perforation to flow behind the casing horizontally, upwardly and/or downwardly. The possible flow of injected water is indicated in FIGS. 1-3 by the patterns of arrows, and the flow components identified as:

$V_T$ = the total volume flow rate of injection water flowing downwardly within the casing just below a given perforation;

$V_F^{DOWN}$ = the volume flow rate of water flowing downwardly behind the casing just below a given perforation;

$V_F^{UP}$ = the volume flow rate of water flowing upwardly behind the casing just above a given perforation;

$V_F^{HOR}$ = the volume flow rate of water flowing horizontally into a formation at the level of a given perforation; and $V_{TOTAL}$ = the total volume flow rate of injection water flowing within the casing just above a given perforation and, for the highest perforation, is the volume flow rate of water injected into the well at the surface.

In FIG. 2, the sonde 10 is schematically shown positioned below a casing perforation 50. Certain distances descriptive of the geometry of the casing and sonde are marked off in FIG. 2 and described in detail hereinafter.

FIG. 3 shows the orientation of the source and detectors within the sonde 10 when the sonde is positioned above a casing perforation 52 for data acquisition purposes. When upward fluid flow is to be monitored, the source is positioned below the detectors as in FIG. 3. Thus, the configuration of FIG. 3 is utilized in monitoring the upward fluid flow behind the casing. To monitor downward fluid flow, both within and behind the casing, the configuration of FIG. 2 is utilized in which the sonde is positioned below the perforation through which fluid is communicated beyond the casing, and the detectors are below the source. Thus, in each case, the fluid whose movement is being monitored passes first laterally opposite the source 14 for irradiation purposes, then moves by the detectors D1 and D2 for sensing purposes. In both configurations shown in FIGS. 2 and 3, the spinner sonde 10 is constructed with the spinner flowmeter at the bottom of the sonde.

To enable the same sonde 10 to be used for both downward and upward flow measurements, the sonde 10 may be of modular construction. Thus, the sonde may be partially dismantled to invert the detector and source portion to change between the configurations shown in FIGS. 2 and 3. Further discussion of the construction and use of such a modular sonde may be found in the aforementioned '781 patent.

Figure 4:
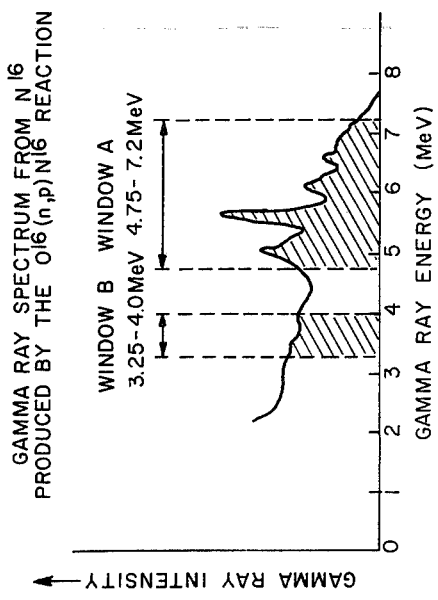
FIG. 4 is a graphical representation of the gamma ray spectrum generated for use in the logging operation, indicating two energy windows.

FIG. 4 shows a gamma ray spectrum from the $O^{16}(n,p)N^{16}$ reaction that may be detected by the detectors D1 and D2. The double-ended arrows identify two energy windows A and B, respectively. Data from the detectors is analyzed in terms of energy windows A and B, counts for all other gamma ray energies being deleted in the data analysis operation. Window A includes the 7.12 and 6.3 MEV primary radiation peaks occurring in the decay of the nitrogen 16 isotope. Gamma rays of these energies reach the detectors D1 and D2 directly. Energy window B includes energies of gamma rays resulting from collisions, primarily of the Compton scattering type, of the primary radiation with material lying between the gamma-producing particles and the detectors.

Figure 5:
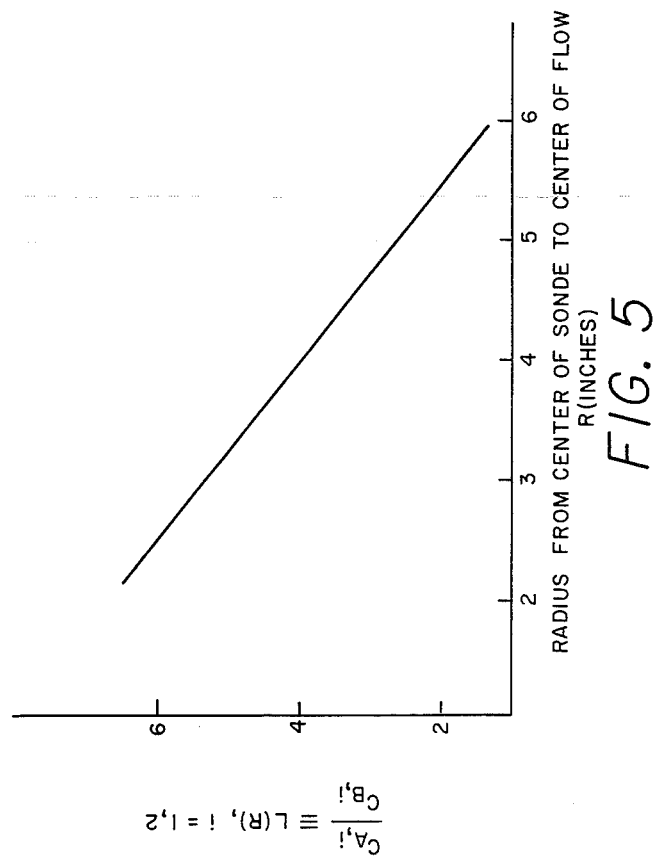
FIG. 5 is a graphical representation showing the count rate ratio of two energy windows for a single detector as a function of distance from the center of the sonde to the center of the flow.

If $C_A(R)$ is defined as the count rate recorded in window A for gamma rays produced at a distance R from a detector, and $C_B(R)$ is the count rate recorded in window B for the same distance R, it can be shown by experimentation as well as monte carlo calculations that the ratio of counting rates $C_A/C_B$ for a single detector as a function of the radial distance R from the center of the sonde is essentially linear as shown in FIG. 5. This functional relationship between the ratio of counting rates for a single counter counting in the two windows A and B is defined as L(R). An approximate analytical expression for the function L(R) for a particular sonde geometry may be developed. For a sonde of the type described herein, it has been found that $$L(R) = 6.5 - 0.8R. \qquad (1)$$

Further discussion of this relationship appears in the aforementioned '781 patent.

To obtain the necessary count rate data to profile the water injection characteristics of an injection well perforated at one or more levels, the sonde 10 may be positioned just below the top perforation as shown in FIG. 2. With the detectors D1 and D2 below the source, the sonde is in configuration for monitoring the downward flow of water both within and behind the casing 42. The source 14 is pulsed to provide the necessary neutron radiation to transmute the oxygen 16 particles in the water flowing downwardly both within and behind the casing, thereby generating unstable nitrogen 16 particles. As the irradiated water flows down by the sonde 10, the detectors D1 and D2 are activated to sense the emitted gamma rays. The surface circuitry analyzes the count rate data in terms of the two detectors D1 and D2, with the count rate data further distinguished as to the two energy windows A and B.

To monitor upward flow of injection water passing behind the casing above a perforation, the sonde is positioned above the perforation and oriented with the radiation detectors above the source as shown in FIG. 3. The same method of operation of the neutron source and detectors is followed as in the case of the downward flow monitoring. Thus, the irradiated injection water moves along the sonde but behind the casing whereupon the emitted gamma rays are sensed by the detectors D1 and D2. Analysis of the count rate data is made in terms of the two detectors as well as the two windows A and B.

Before the count rate data may be completely analyzed to determine the volume flow rates of the injected water in the various possible directions behind the casing, the total volume flow rate of water within the casing above the top perforation, $V_{TOTAL}$, is determined. This may be accomplished with the sonde 10 of the present invention by placing the sonde with the spinner blade assembly 24 above the highest perforation level. With water being injected into the well, the blades are rotated by the fluid flow down the casing, and the spinner flowmeter 22 generates an electrical signal reflecting the blade rotation rate and, therefore, the linear flow velocity $v_T$ of water moving down within the casing, but above the first perforation. Then, $$V_{TOTAL} = \pi v_T (R_{CSG}^2 - R_{SD}^2) \qquad (2)$$

where $R_{CSG}$ is the known inner radius of the casing 42 and $R_{SD}$ is the known outer radius of the sonde 10, as indicated in FIG. 2. $V_T$ is similarly obtained by placing the sonde with the spinner flowmeter just below the perforation level in question, measuring the fluid flow rate, and using equation (2) to yield $V_T$ in place of $V_{TOTAL}$.

The value of $V_{TOTAL}$ at the top of the well may also be determined by metering the injection rate of the water at the surface. Still another method of determining this value of the downward volume flow rate involves the use of the sonde 10 for flow measurements within the casing as described in the aforementioned '781 patent.

For monitoring of water flow at the next lower perforation, the value of $V_T$ from just below the highest perforation is taken as $V_{TOTAL}$. Then $V_{TOTAL}$ at each subsequent perforation monitoring is given by $V_T$ from the perforation immediately above.

The values for $V_F^{DOWN}$, $V_T$, $V_F^{UP}$ and $V_F^{HOR}$ may be determined in relation to the injection water flow at each perforation level in the cased well by securing and reducing count rate and flowmeter data as follows.

With the sonde configured to measure flow in the downward direction and positioned immediately below the first perforation, the linear velocity of downward flow behind the casing, $v_F$, may be obtained by noting the following count rates:

$C_{A,1}$ = count rate of detector D1 for gamma rays within window A;

$C_{B,1}$ = count rate of detector D1 for gamma rays within window B;

$C_{A,2}$ = count rate of detector D2 for gamma rays within window A; and $C_{B,2}$ = count rate of detector D2 for gamma rays within window B.

The count rate for each detector within a given energy window is, in general, composed of count rate contributions from irradiated fluid flowing within the casing as well as behind the casing. Thus, $$C_{A,1} = C_{A,1}^T + C_{A,1}^F \qquad (3)$$

where $C_{A,1}^T$ is the contribution from water flowing within the casing, and $C_{A,1}^F$ is the contribution from the flow behind the casing. Solving for $C_{A,1}^F$ yields $$C_{A,1}^F = C_{A,1} - C_{A,1}^T. \qquad (4)$$

Similarly, the count rate in window B for detector D1 is given by $$C_{B,1} = C_{B,1}^T + C_{B,1}^F \qquad (5)$$

where $C_{B,1}^T$ and $C_{B,1}^F$ are the contributions from flow within and behind the casing, respectively.

For the current sonde geometry, $$L(R_k) = C_{A,1}^k / C_{B,1}^k = 6.5 - 0.8 R_k \qquad (6)$$

where k = T or F for flow within or behind the casing, respectively. Thus, for flow within the casing, $$L(R_T) = C_{A,1}^T / C_{B,1}^T = 6.5 - 0.8 R_T. \qquad (7)$$

As indicated in FIG. 2, $R_T$ is the distance from the center of the sonde to the center of the annular region between the outer surface of the sonde and the inner surface of the casing 42. The value of $R_T$ may be computed from the equation $$R_T = (R_{CSG} + R_{SD})/2 \qquad (8)$$

where $R_{CSG}$ is the inner radius of the casing 42, and $R_{SD}$ is the outer radius of the sonde 10, as noted hereinbefore.

Solving equation (7) for $C_{B,1}^T$ substituting into equation (5) and solving for $C_{B,1}^F$ yields $$C_{B,1}{}^F = C_{B,1} - [C_{A,1}{}^T/(6.5 - 0.8R_T)]. \tag{9}$$

Dividing equation (4) by equation (9) yields $$\frac{C_{A,1}{}^F}{C_{B,1}{}^F} = \frac{C_{A,1} - C_{A,1}{}^T}{C_{B,1} - [C_{A,1}{}^T/(6.5 - 0.8R_T)]} = L(R_F). \tag{10}$$

Noting that $$L(R_F) = C_{A,1}{}^F/C_{B,1}{}^F = 6.5 - 0.8R_F \tag{11}$$

where $R_F$ is the distance from the center of the sonde to the center of the flow behind the casing, equation (10) may be written $$R_F = \frac{C_{A,1}^T - C_{A,1}}{0.8[C_{B,1} - (C_{A,1}^T/(6.5 - 0.8R_T))]} + 8.13. \tag{12}$$

All quantities on the right hand side of the equation (12) are either measured or computed from known dimensions with the exception of $C_{A,1}{}^T$. It will be appreciated that an equation for $R_F$ similar to equation (12) may be derived involving count rates obtained with detector D2. It can be shown that $$C_{i,j}{}^k = 4e^{-(\lambda s_j/v_k{}^l)} V_k{}^l Q_i \sinh(\lambda a/2v_k{}^l) \sinh(\lambda b/2v_k{}^l) R_k{}^{-4} \tag{13}$$

where $\lambda$ is the decay constant of $N^{16}$, $S_j$ is the source-detector spacing, j being 1 or 2 to identify detector D1 or D2, i=A or B to indicate the radiation energy window, $v_k$=linear flow rate, k=T or F to indicate flow within or behind the casing, respectively, 1 is an index indicating flow upward or downward, a and b are geometric constants determined by the sonde design, and $Q_i$ is a calibration constant. For flow within the casing (which is downward), equation (13) may be written $$C_{A,1}{}^T = 4e^{-(\lambda S_1/v_T)} V_T Q_A \sinh(\lambda a/2v_T) \sinh(\lambda b/2v_T) R_T{}^{-4}. \tag{14}$$

The spinner flowmeter is used to measure $v_T$ as described hereinbefore, and equation (2) may be used to solve for $V_T$ just below the top perforation. Then, substituting from equations (2) and (8) into (14) yields $$C_{A,1}^T = 64\pi e^{-(\lambda S_1/v_T)} v_T (R_{CSG}^2 - R_{SD}^2) Q_A \sinh(\lambda S D a/2v_T) \cdot \sinh(\lambda b/2v_T)(R_{CSG} - R_{SD})^{-4} \tag{15}$$

wherein all the terms on the right hand side are either measured or known parameters, constants or dimensions. Thus, with $C_{A,1}$, $C_{B,1}$ and $v_T$ measured, equations (8) and (15) along with (12) are used to determine $R_F$, the radial distance from the center of the casing 42 to the center of the fluid flow behind the casing. With the sonde 10 configured to measure downward flow, as shown in FIG. 2, the values for $v_T$, $C_{A,1}$ and $C_{B,1}$ used in equations (8) and (15) along with equation (12) yield a value for $R_F$ locating the center of downward fluid flow behind the casing.

It will be appreciated that an equation for $R_F$ similar to equation (12) may be derived involving count rates obtained with detector D2.

It can be shown that $$C_{A,1}{}^F/C_{A,2}{}^F = e^{kv_F 1} \tag{16}$$

where $k = \lambda \Delta s$, with $\lambda$ the decay constant of $N^{16}$ and 1 indicating upward or downward fluid flow as before, $v_F{}^1$=linear flow rate behind the casing, and $\Delta s$ is the spacing between the detectors D1 and D2 as indicated in FIG. 2. Similarly, $$C_{A,1}{}^T/C_{A,2}{}^T = e^{kv_T} \tag{17}$$

since there is only downward fluid flow within the casing.

Equation (4) may be rewritten for detector D2 as $$C_{A,2}{}^F = C_{A,2} - C_{A,2}{}^T. \tag{18}$$

Then, combining equations (17) and (18) yields $$C_{A,2}{}^F = C_{A,2} - C_{A,1}{}^T e^{-kv_T}. \tag{19}$$

Substituting from equations (4) and (19) into equation (16), and considering downward flow, yields $$(C_{A,1} - C_{A,1}{}^T)/(C_{A,2} - C_{A,1}{}^T e^{-kv_T}) = e^{kv_{FDOWN}}, \tag{20}$$

which may be rewritten as $$v_F^{DOWN} = k^{-1} \ln \left[ \frac{C_{A,1} - C_{A,1}^T}{C_{A,2} - C_{A,1}^T e^{-kv_T}} \right]. \tag{21}$$

$C_{A,1}{}^T$ may be found by use of equation (15); all other terms as the right hand side of equation (21) are either known or measured.

The volume flow rate of water in the downward direction behind the casing, $V_F^{DOWN}$, just below the highest perforation, can be found in terms of known, measured, or calculated quantities. Equation (13) may be rewritten for energy window A, counter D1, and downward flow behind the casing, and solved for $V_F^{DOWN}$ as $$V_F^{DOWN} = \frac{C_{A,1}^F e^{\lambda s_1/v_F^{DOWN}} R_F^4}{4Q_A \sinh(\lambda a/2v_F^{DOWN}) \sinh(\lambda b/2v_F^{DOWN})}. \tag{22}$$

Recalling equation, (4), it will be appreciated that determining $C_{A,1}{}^T$ from equation (15), $R_F$ from equation (12), and $v_F^{DOWN}$ from equation (21) provides all the quantities on the right hand side of equation (22) that are not known or directly measured. Consequently, counts $C_{A,1}$, $C_{A,2}$ and $C_{B,1}$, and flowmeter measurement $v_T$, along with known or measureable constants and parameters yield a value for $V_F^{DOWN}$ immediately below the top perforation.

The sonde 10 may be reconfigured and repositioned immediately above a perforation, as illustrated in FIG. 3, and the value of the volume flow rate of fluid moving upwardly behind the casing and above the perforation, $V_F^{UP}$, may be obtained by the same technique used for finding the downward volume flow rate, recalling that there is no upward flow within the casing above the perforation. Thus, $C_{A,1}{}^T$, $C_{A,2}{}^T$, $C_{B,1}{}^T$ and $C_{B,2}{}^T$ are all zero for upward flow, and $$C_{A,1} = C_{A,1}{}^F$$

$$C_{A,2} = C_{A,2}{}^F$$

$$C_{B,1} = C_{B,1}{}^F \text{ and}$$

$$C_{B,2} = C_{B,2}{}^F \qquad (23)$$

Equation (13) may then be written as $$C_{A,1}^F = C_{A,1} = 4e^{-\lambda s1/v_F{}^{UP}} v_F^{UP} Q_A \sinh(\lambda a/2 v_F^{UP}) \cdot \sinh(\lambda b/2 v_F^{UP}) R_F^{-4}. \qquad (24)$$

For upward flow behind the casing, equation (16) becomes $$C_{A,1}/C_{A,2} = e^{kv_F,UP} \qquad (25)$$

which provides $v_F^{UP}$ in terms of known constants or parameters, and measureable quantities as $$v_F^{UP} = k^{-1} \ln(C_{A,1}/C_{A,2}). \qquad (26)$$

Equation (6) now yields, for upward flow, $$R_F = 8.13 - C_{A,1}/(0.8\, C_{B,1}). \qquad (27)$$

Solving equation (24) for $V_F^{UP}$ provides $$V_F^{UP} = \frac{C_{A,1} e^{\lambda s1/v_F^{UP}} R_F^4}{4 Q_A \sinh(\lambda a/2 v_F^{UP}) \sinh(\lambda b/2 u_F^{UP})} \qquad (28)$$

in which all terms on the right hand side, in combination with equations (26) and (27), are known, measureable, and/or may be calculated. Thus, counts $C_{A,1}$, $C_{A,2}$ and $C_{B,1}$, along with known or measureable constants and parameters yield a value for $V_F^{UP}$ immediately above the perforation.

The value of the volume flow rate moving horizontally away from the perforation of interest may be obtained from equation (29):

$$V_F^{HOR} = V_{TOTAL} - V_T - V_F^{UP} - V_F^{DOWN}. \qquad (29)$$

If additional perforations are to be examined, the sonde is positioned below the second perforation, and $V_{TOTAL}$ is set equal to the previous value of $V_T$. Then, the previous steps for determining the various volume flow rates are repeated. As noted hereinbefore, all of the downward flow measurements can be made sequentially in a single trip down the well by simply positioning the sonde below for data acquisition below each succeeding perforation. Similarly, all of the upward flow measurements may be made sequentially in a single trip by appropriately positioning the sonde above each perforation in turn. For each perforation to be examined, the value of $V_{TOTAL}$ is set equal to the value of $V_T$ determined for the next highest perforation.

It will be appreciated that no assumptions need be made as to the value of $R_F$ to locate the center of flow behind the casing. Consequently, both channels in the casing cement and passages in the surrounding earth structure are taken into consideration in the calculations, and the present invention provides techniques for monitoring fluid flow in both types of pathways.

The present invention provides techniques for constructing a water injection profile for a perforated cased well with any number of perforations. By monitoring the flow of injected water within the casing as well as behind the casing in the vicinity of, say, each perforation, the proportion of the injected fluid reaching each of the perforation levels within the well may be ascertained. Further, where water flow channels are present along and/or behind the cement lining of the borehole, the percentage of injected fluid moving horizontally into the nearby formations may be determined. In this way, a rather complete picture may be obtained of the disposition of the injection water forced into the well as distributed by the particular injection well into the surrounding formations, and the effectiveness of the injection operation evaluated.

The foregoing disclosure and description of the invention is illustrative and explanatory thereof, and various changes in the method steps as well as in the details of the illustrated methods may be made within the scope of the appended claims without departing from the spirit of the invention.

I claim:

1. A method for determining the characteristics of flow of injection water in and beyond a known size cased well borehole having casing perforations at one or more levels within the well comprising the following steps:

(a) providing a well tool having a source of radiation and at least two detectors longitudinally spaced from said source and each other, and having flowmeter means;

(b) positioning said well tool below a level of casing perforation with said radiation source above said detectors;

(c) operating said flowmeter means to monitor fluid flow within said casing below said perforation level, and generating signals indicative of the linear velocity of said fluid flow;

(d) irradiating the borehole environs, including injection water being forced into the borehole, by radiation from said radiation source;

(e) detecting radiation from the activated injection water by operation of said detectors and generating signals representative thereof;

(f) distinguishing count rate data from at least one of said detectors according to two energy ranges of detected radiation;

(g) combining said count rate data and said linear flow velocity obtained by operation of said flowmeter means according to a first predetermined relationship to derive an indication of the linear flow rate of said activated injection water downwardly behind said casing below said perforation level;

(h) positioning said well tool above said level of casing perforation with said radiation source below said detectors, and repeating steps (d) through (f); and (i) combining said count rate data according to a second predetermined relationship to derive an indication of the linear flow rate of said activated injection water upwardly behind said casing above said perforation level.

2. A method as defined in claim 1 further comprising the additional step of combining count rate data and said linear flow velocity within said casing, acquired with said well tool positioned below said perforation level, according to a third predetermined relationship to derive an indication of the location of the center of flow of said activated injection water downwardly behind said casing below said perforation level.

3. A method as defined in claim 2 further comprising the additional step of combining count rate data and said linear flow velocity within said casing, acquired with said well tool positioned below said perforation level, and said indication of the location of the center of downward flow behind said casing according to a fourth predetermined relationship to derive an indication of the volume flow rate of said activated injection water downwardly behind said casing below said perforation level.

4. A method as defined in claim 3 further comprising the additional step of combining count rate data, acquired with said well tool positioned above said perforation level, according to a fifth predetermined relationship to derive an indication of the location of the center of flow of said activated injection water upwardly behind said casing above said perforation level.

5. A method as defined in claim 4 further comprising the additional step of combining count rate data, acquired with said well tool positioned above said perforation level, and said indication of the location of the center of upward flow behind said casing, according to a sixth predetermined relationship to derive an indication of the volume flow rate of said activated injection water upwardly behind said casing above said perforation level.

6. A method as defined in claim 5 further comprising the additional step of combining said volume flow rates for said activated injection water flowing downwardly and upwardly behind said casing with the volume flow rate of injection water flowing downwardly within said casing just above said perforation level and the volume flow rate of injection water flowing downwardly within said casing just below said perforation level, based on said linear flow velocity obtained by operation of said flowmeter means, to obtain an indication of the volume flow rate of injection water into the formation surrounding said borehole at the perforation level.

7. A method as defined in claim 6 further comprising repeating the steps of claims 1 through 6 for additional perforation levels of said injection well.

8. A method as defined in claim 7 wherein all steps (d) and (e) of claim 1 are carried out with said well tool positioned, and oriented with said radiation source above said detectors, for acquisition of count rate data corresponding to downward flow rates below perforation levels in a single trip of said well tool in said borehole, and all steps (d) and (e) of claim 1 are carried out with said well tool positioned, and oriented with said radiation source below said detectors, for acquisition of count rate data corresponding to upward flow rates above perforation levels in a single trip of said well tool in said borehole.

9. A method as defined in claim 1 further comprising repeating the steps of claim 1 for additional perforation levels of said injection well.

10. A method as defined in claim 1 wherein said neutron source provides neutrons of sufficiently high energy to cause the nuclear reaction $O^{16}(n,p)N^{16}$ in said injection water, said detectors are gamma ray detectors, and said activated injection water generates gamma rays from said $N^{16}$ particles produced therein, which gamma rays may be detected by said detectors.

11. A method as defined in claim 1 further comprising the additional step of combining count rate data, acquired with said well tool positioned above said perforation level, according to a third predetermined relationship to derive an indication of the location of the center of flow of said activated injection water upwardly behind said casing above said perforation level.

12. A method as defined in claim 11 further comprising the additional step of combining count rate data, acquired with said well tool positioned above said perforation level, and said indication of the location of the center of upward flow behind the casing according to a fourth predetermined relationship to derive an indication of the volume flow rate of said activated injection water upwardly behind said casing above said perforation level.

13. A method as defined in claim 1 further comprising the additional step of combining said linear flow velocity within said casing, obtained by operation of said flowmeter means, with dimensions of said casing and said well tool to obtain an indication of the volume flow rate of injection water downwardly within said casing just below said perforation level.

14. A method as defined in claim 1 further comprising the additional steps of:
(a) positioning said well tool above said perforation level;
(b) operating said flowmeter means to monitor fluid flow within said casing above said perforation level, and generating signals indicative of the linear velocity of said fluid flow; and
(c) combining said linear flow velocity for fluid within said casing above said perforation level with dimensions of said casing and said well tool to obtain an indication of the volume flow rate of injection water downwardly within said casing just above said perforation level.

15. A method as defined in claim 14 wherein the step of positioning said well tool above said perforation level is carried out by positioning said well tool between the top of said well borehole and the highest level of casing perforations.

16. A method of determining the characteristics of flow of injection water in and beyond a known size cased well borehole having casing perforations at one or more levels within the well comprising the following steps:
(a) providing a well tool having a source of neutrons of sufficient energy to cause the nuclear reaction $O^{16}(n,p)N^{16}$, at least two gamma ray detectors longitudinally spaced from said source and each other, and having spinner flowmeter means;
(b) positioning said well tool below a perforation level with said detectors below said source in a down-flow configuration, and positioning said well tool above a perforation level with said detectors above said source in an up-flow configuration;
(c) with said well tool in said down-flow configuration and in said up-flow configuration, repetitively irradiating the borehole environs, including said injection water being forced into said well, with bursts of high energy neutrons from said source, detecting, subsequent to each neutron burst, at each of said detectors gamma rays caused by the decay of the unstable isotope nitrogen 16, and generating signals representative thereof;
(d) distinguishing count rate data from said detectors according to two energy ranges of detected gamma rays;
(e) with said well tool positioned below and above said perforation level, operating said spinner flowmeter means to obtain values of the linear flow rate of injection water flowing downwardly within said casing below and above, respectively, said perforation level;

(f) combining said count rate data, acquired with said well tool in said down-flow configuration, according to a first predetermined relationship to derive an indication of the linear flow rate of injection water flowing downwardly behind said casing below said perforation level; and (g) combining said count rate data, acquired with said well tool in said up-flow configuration, according to a second predetermined relationship to derive an indication of the linear flow rate of injection water flowing upwardly behind said casing above said perforation level.

17. A method as defined in claim 16 further comprising the additional steps of combining each of said linear flow rates for flow downwardly behind said casing and upwardly behind said casing in a third predetermined relationship to obtain indications of the volume flow rate of injection water downwardly behind said casing, and the volume flow rate of injection water upwardly behind said casing, respectively.

18. A method as defined in claim 17 further comprising the additional step of combining said volume flow rates for flow downwardly and upwardly behind said casing with said volume flow rates for flow downwardly within said casing just below and above said perforation level to obtain an indication of the volume flow rate of injection water into the formation surrounding said borehole at the perforation level.

19. A method as defined in claim 18 further comprising repeating the steps of claims 16 through 18 for additional perforation levels of said injection well.

20. A method as defined in claim 16 comprising the additional steps of carrying out the steps of claim 16 for additional perforation levels of said injection well wherein all data is acquired with said well tool in down-flow configuration in a single trip of said well tool in said well, and all data is acquired with said well tool in up-flow configuration in a single trip of said well tool in said well.

* * * * *